Figure 1:
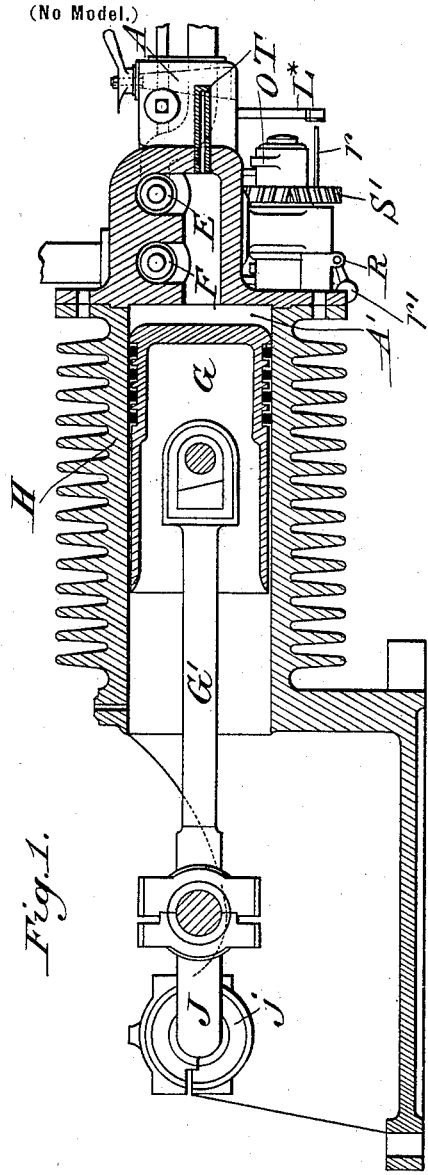

No. 610,869. Patented Sept. 13, 1898.
L. V. PRATIS & P. MARENGO.
GAS MOTOR.
(Application filed July 15, 1897.)
(No Model.) 2 Sheets—Sheet 1.

Attest:
Walter W. H. Robinson Jr.
F. H. Schott

Inventors:
Leopoldo Vittorio Pratis and
Pietro Marengo
by Chas. J. Hedrick
their attorney No. 610,869. Patented Sept. 13, 1898.
L. V. PRATIS & P. MARENGO.
GAS MOTOR.
(Application filed July 15, 1897.)
(No Model.) 2 Sheets—Sheet 2.
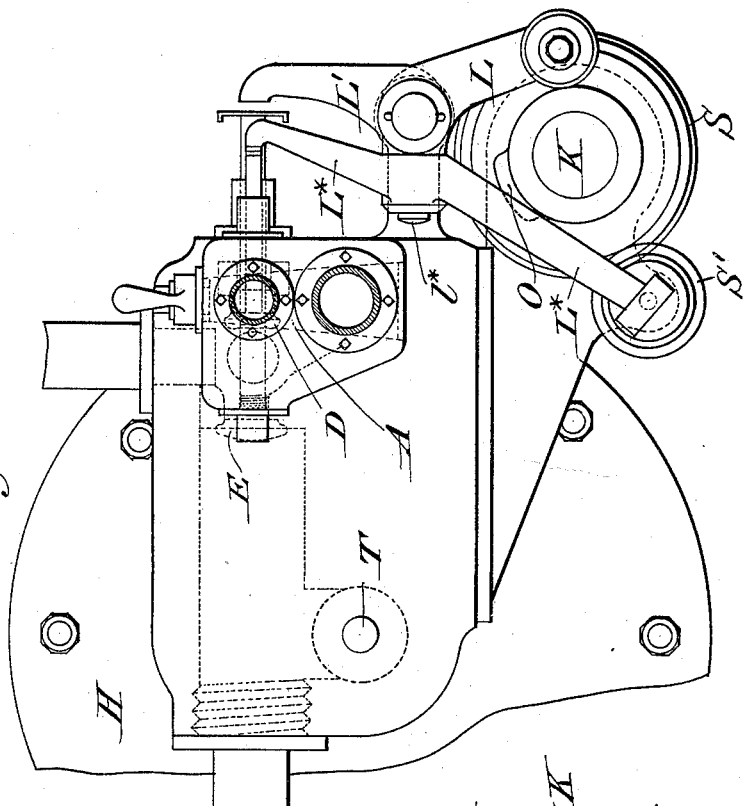
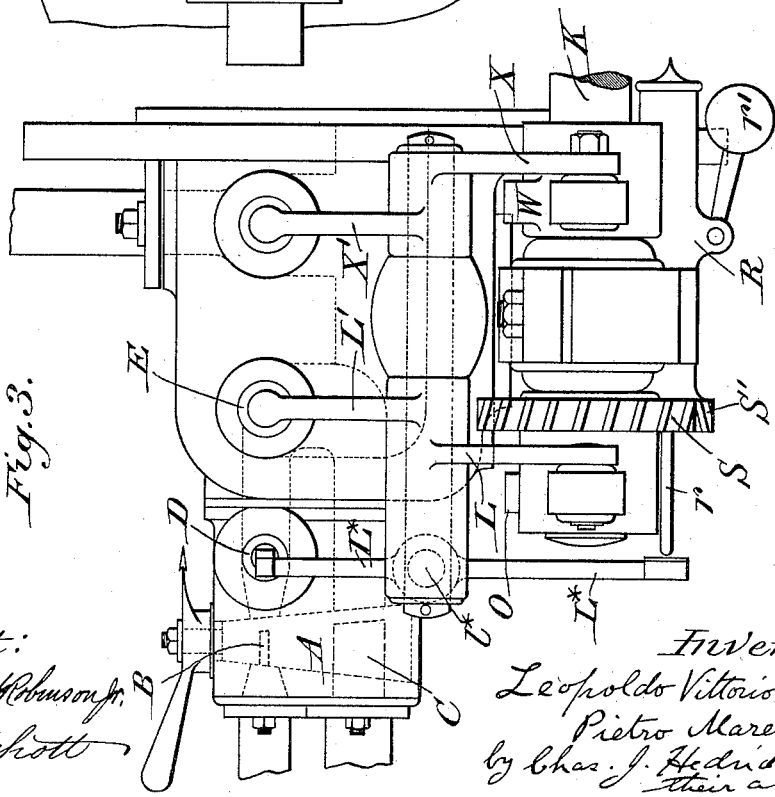

UNITED STATES PATENT OFFICE.

LEOPOLDO VITTORIO PRATIS AND PIETRO MARENGO, OF TURIN, ITALY.

GAS-MOTOR.

SPECIFICATION forming part of Letters Patent No. 610,869, dated September 13, 1898.

Application filed July 15, 1897. Serial No. 644,703. (No model.)

*To all whom it may concern:*

Be it known that we, LEOPOLDO VITTORIO PRATIS and PIETRO MARENGO, citizens of the Kingdom of Italy, residing at Turin, in said Kingdom, have invented certain new and useful Improvements in Gas-Motors Using Pure Hydrogen, of which invention the following specification is a full, clear, and exact description.

Among mixtures of combustible gases and air it is pure hydrogen which develops the most heat and produces a temperature the most elevated. These properties led us to study how to apply it to the production of motive power in compression gas-engines.

By introducing several modifications in the structure of the motors, with reference to the degree of compression of the mixture the size of the gas and air inlet openings, as set forth in the following description, we have obtained with our gas-motor, using pure hydrogen, a development of force superior to that obtained with coal-gas motors by means of a notably inferior consumption of the pure hydrogen.

The result obtained by our motor is the more remarkable since the heat developed by a liter of pure hydrogen gas is only about 3.10 calories, whereas the heat development from a liter of coal-gas is on the average about five calories. Our gas-motor using pure hydrogen consequently utilizes much more perfectly the heat developed by the combustion than do motors working with coal-gas. In fact, first, the high velocity of flame propagation in a mixture of hydrogen and air produces immediately in the motor-cylinder of the engine the highest pressure corresponding with the complete combustion of the gas, and hence results in a more prolonged and more efficacious expansion; second, the feeble power of emission of radiant heat which is possessed by pure hydrogen, as compared with other combustible gases, contributes to the development of a more elevated temperature of combustion and is attended at the same time with less absorption of heat by the walls of the motor-cylinder. In fact, our motor is able to operate without making use of a circulation of cold water about the cylinder. For motors of five-horse power and upward it suffices to cast the motor-cylinders with outside projections for increasing the surface in contact with the air.

Besides a larger coefficient of yield of force, which we have estimated at about sixty per cent., our gas-motor using pure hydrogen has also the advantage of preserving for a longer time the cylinder-walls, as well as the other parts of the engine, and at the same time requiring less lubrication, for pure hydrogen exerts no corrosive action, does not at all soil the parts by fuliginous deposits, and exhibits a perfect adaptability.

In gas-engines using carbureted gas or vapor in admixture with air ignition of the charges would be apt to take place spontaneously in the hot cylinder (notwithstanding the cooling by a water-jacket) if a high degree of compression (such as we have found essential) were employed. Without a cooling of the cylinder by a water-jacket it is believed to be impossible to employ such high compression on a mixture of air and carbureted hydrogen (gas or vapor) on account of spontaneous and premature ignition. Using hydrogen and air in the proportions employed by us we have not been troubled with spontaneous ignition in our cylinders having no water-jackets under the very high degree of compression we employ—namely, seven or eight atmospheres as a minimum.

Now that we have explained in a general way the technical principles and advantages of our motor we will proceed to explain the same in a more detailed manner with reference to the accompanying drawings.

Figure 2:
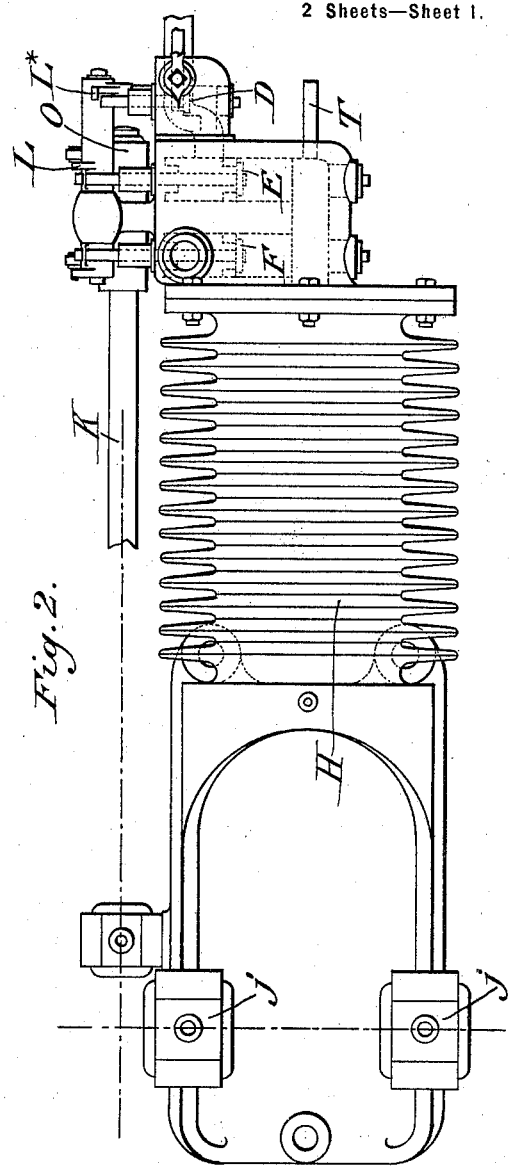

Figure 1 is a longitudinal vertical section, through the motor-cylinder and the chamber of compression and explosion, of an engine in accordance with the invention. Fig. 2 is a plan of the same. Fig. 3 is a side elevation, on an enlarged scale, of the chamber of compression and combustion with the valve apparatus carried thereby; and Fig. 4 is an end view of the engine on the scale of Fig. 3.

The gas is introduced through the cock A, Fig. 3, which controls at the same time the introduction of air for the admixture. The sections of the holes B and C are in the proportion of one for the gas to eighteen or twenty for the air, so that the cock A always gives these proportions of air and gas as well when it is barely open for keeping the engine running as when it is fully open.

The valve D is for the admission of gas and is under the control of the regulator R. The valve E, operated directly by a cam O, admits the mixture into the cylinder.

F is the discharge or escape valve.

As shown, the piston G works in the engine-cylinder H and is connected by the pitman G' with the crank-shaft J, which turns in bearings $j'$, Fig. 2, of the frame and is connected by bevel-gearing (not shown but common in gas-engines of the compression type) with the valve-operating shaft K, so that this latter makes one revolution to two of the crank-shaft J. During each alternate outstroke of the piston G the cam O acts upon the roller at the end of lever-arm L, and thereby moves it outward and the lever-arm L' inward, so as to open the valve E, Figs. 3 and 4. The hub or sleeve which carries the lever-arms L L' is provided also with a lever L*, which is pivoted on a stud $l^*$, forming part of said hub, so that it may turn in a plane transverse to the stem of valve D. In its normal position (as represented) the upper end of the lever L* lies just behind the said valve-stem, and consequently when the cam O pushes out the lower end of arm L the upper end of lever L* is moved in to open the valve D at the same time that the lever-arm L' opens the valve E. When the lever L*, therefore, is in normal position, the air and gas enter the cylinder H during the outstroke of the piston G in volumes proportionate to the sections of the holes B and C—namely, eighteen to twenty volumes of air to one volume of hydrogen gas. The lower end of the lever L* lies, however, in the path of a pin $r$, which partakes of the centrifugal and centripetal movements of the governor-balls $r'$ in such manner that when the balls fly out to an abnormal degree the lever L* is turned on its stud $l^*$ into such position that its upper end is no longer opposite the stem of valve D. When it is in this position, the lever L* is rocked with the arms L L', but it misses the stem of valve D, and this valve, therefore, remaining closed no gas would be admitted during the corresponding outstroke of the piston G. The mechanism for transmitting motion from the governor-balls $r'$ to the pin $r$ is not shown, but mechanism for the purpose is well known in the art. The shaft of regulator R is driven from the valve-operating shaft K through the large gear S, fast on the said shaft K, and the pinion S' on the regulator-shaft. At each alternate instroke of the piston G the mixture of air and hydrogen gas is compressed in the back end of the cylinder and is exploded at the dead-point by the hot tube T, which can be made incandescent in any known or suitable way. After an explosion during each succeeding outstroke of piston G the highly-heated gases expand and force the piston outward, so that it communicates motion to the crank-shaft J through the pitman G'. During the next succeeding instroke the cam W, Fig. 3, acts upon the lever-arm X, so as to move the arm X', and thereby to open the valve F and allow the products of combustion to escape.

The cycle of operation is, therefore, as follows: First, admission through the cock A of the explosive mixture of gas and air in the specified proportions; second, compression of the mixture to seven or eight atmospheres, the depth of the chamber A' at the inner end of the stroke being about but not more than one-tenth of the total stroke; third, explosion of the mixture with production of a pressure of about thirty-five atmospheres; fourth, expansion of one to ten; fifth, escape and discharge of the burned gases. The lighting takes place at the inner dead-point in such manner that the explosion is nearly or quite terminated at the moment at which the forward stroke commences. The combustion of the mixture is always complete and very rapid, the explosion very sure, the exhaust without smoke, and the burned gases free from the oxid of carbon. All the heat developed by the explosion is almost completely utilized, and the burned gases which escape are at a maximum temperature of 50° centigrade.

As the cylinder is not cooled by water, (as customary, if not universal, with explosive-gas engines of five-horse power and upward,) the mean temperature of its interior surfaces will during the expansion more nearly approximate the mean temperature of the burned gases than would be the case if the cylinder of the same engine were cooled with water. Such high temperature of the cylinder-walls modifies the expansion of the burned gases so as to convert into work much of the heat which would be carried off by a body of water surrounding the engine-cylinder.

We claim then—

1. The method of generating motive power, which consists in subjecting a mixture of non-carbureted hydrogen with several times the proportion of air required for the formation of water, to wit with a volume of air from seventeen to twenty times that of the hydrogen, to a compression of not less than seven atmospheres, and igniting the so-compressed mixture, thereby producing a non-luminous nearly instantaneous combustion without fulmination, substantially as described.

2. In an explosive-gas engine, in combination with a gas-engine cylinder uncooled by a jacket of water, and a piston working in said cylinder, a source of non-carbureted hydrogen, means for admitting hydrogen from said source into said cylinder along with several times the proportion of air required for the formation of water, to wit a volume of air from seventeen to twenty times that of the hydrogen, means for compressing said mixture in said cylinder to a pressure of not less than seven atmospheres, means for igniting said mixture at the inner end of said piston's stroke, and means for retaining the burned gases in said cylinder during the forward stroke of said piston and for then discharging the same in an expanded condition, substantially as described.

3. In an explosive-engine, in combination with an engine-cylinder, a motor-piston movable therein, admission-valves comprising a hit-or-miss regulator-valve and a valve with holes for air and combustible gas respectively arranged to regulate both holes in the same sense by one movement of said valve, and an exhaust-valve, substantially as described.

In witness whereof we have hereunto signed our names in the presence of two subscribing witnesses.

LEOPOLDO VITTORIO PRATIS.
PIETRO MARENGO.

Witnesses:
MARIO CAPUCCIO,
HUGO PIZZOTTI.